United States Patent [19]
Gaggero et al.

[11] Patent Number: 5,236,753
[45] Date of Patent: * Aug. 17, 1993

[54] DISPOSABLE, ROLLUP TEMPORARY FLOOR MAT

[75] Inventors: Joseph W. Gaggero, Lawrence; Michael W. Sullivan, Topeka, both of Kans.

[73] Assignee: Lawrence Paper Company, Lawrence, Kans.

[*] Notice: The portion of the term of this patent subsequent to Sep. 22, 2009 has been disclaimed.

[21] Appl. No.: 915,258

[22] Filed: Jul. 20, 1992

Related U.S. Application Data

[63] Continuation-in-part of Ser. No. 653,654, Feb. 8, 1991, Pat. No. 5,149,572.

[51] Int. Cl.$^5$ .............................................. B65B 65/28
[52] U.S. Cl. ............................... 428/43; 15/215; 15/238; 296/97.23; 428/131; 428/134; 428/138; 428/182; 428/186; 428/219; 428/220; 428/906
[58] Field of Search ................. 428/43, 182, 186, 131, 428/134, 135, 219, 220, 906; 296/97.23, 39.3, 39.1, 39.2; 15/215, 238

[56] References Cited

U.S. PATENT DOCUMENTS 2,793,149  5/1957  Richter ............................ 296/97.23
3,407,987 10/1968  Wilke ................................. 428/182

Primary Examiner—George F. Lesmes
Assistant Examiner—Nasser Ahmad
Attorney, Agent, or Firm—Hovey Williams Timmons & Collins

[57] ABSTRACT

A floor mat for use in covering the floor of a motor vehicle comprises a corrugated layer having first and second opposing surfaces and a single face layer affixed to one of the surfaces of the corrugated layer so that the corrugated layer may be rolled up in a direction enclosing the face layer within the corrugated layer. Preferably, at least one tear line is provided for permitting the floor mat to be split into first and second mat portions which may be separately rolled up and removed from the vehicle after use. The first and second mat portions are each adapted to underlie a separate passenger area of the motor vehicle in order to protect the floor of the vehicle from being dirtied during use. In another embodiment, a generally trapezoidally-shaped universal floor mat is provided which can alternately be placed on the floor beneath the front driver's or front passenger's side of a vehicle.

5 Claims, 5 Drawing Sheets

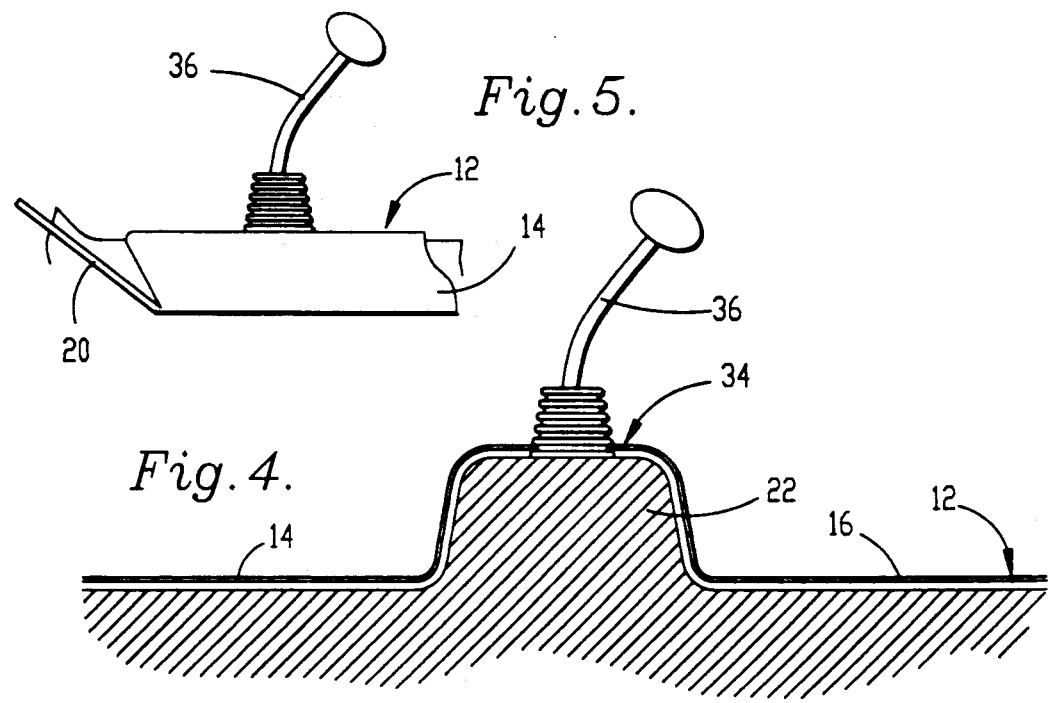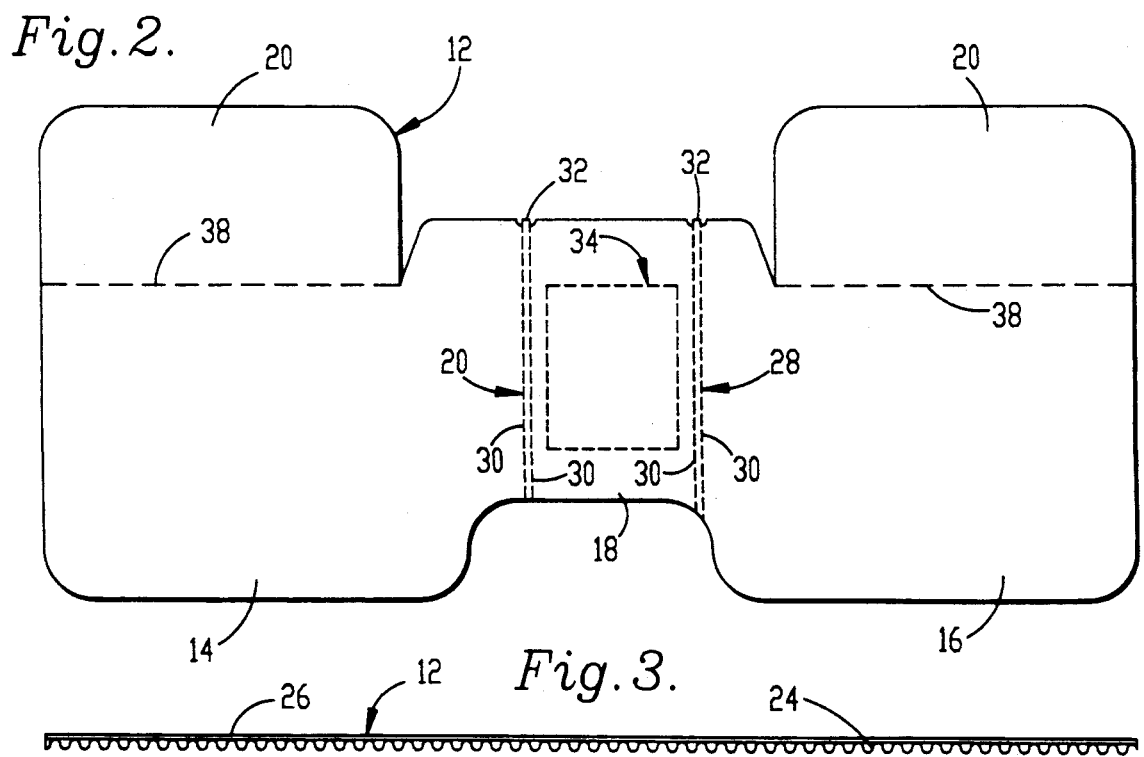

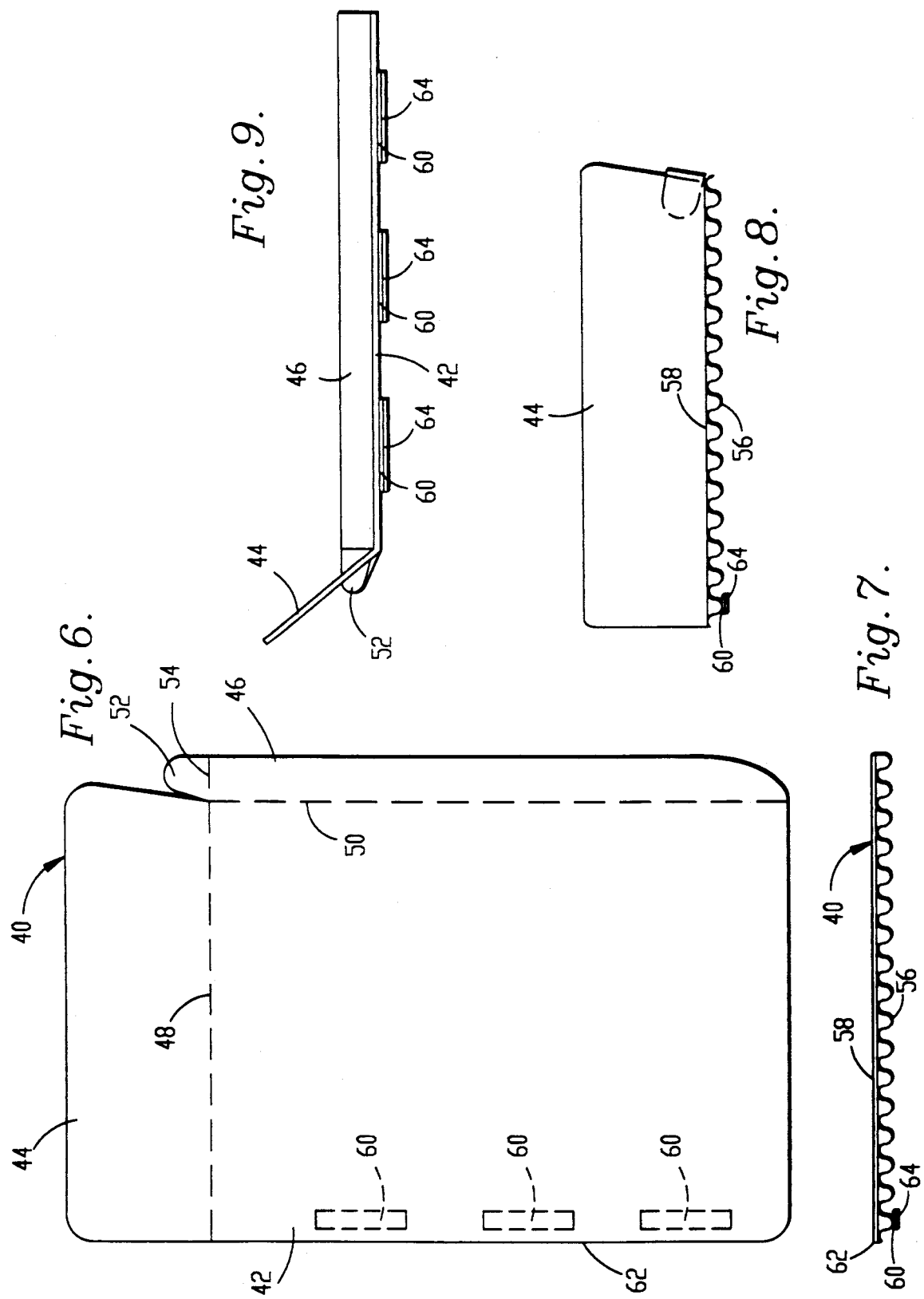

DISPOSABLE, ROLLUP TEMPORARY FLOOR MAT

RELATED APPLICATIONS

This application is a continuation-in-part of application Ser. No. 07/653,654, filed Feb. 8, 1991, now U.S. Pat. No. 5,149,572.

BACKGROUND OF THE INVENTION

1. Field of the Invention

The present invention relates generally to floor mats and, more particularly, to a temporary, rollup mat for use in covering the floor of a motor vehicle in order to protect the floor from debris tracked into the vehicle by a passenger.

2. Discussion of the Prior Art

It is known to provide a permanent floor covering in motor vehicles such as cars and trucks in order to protect the floor from wear and to present an attractive surrounding to passengers. Further, in order to protect these known permanent floor coverings against local wear in certain regions of the floor, such as adjacent control pedals on the operator's side of the vehicle, temporary floor mats are known which may be laid on top of the permanent floor covering. These temporary mats are formed of various materials such as rubber, plastic, fibrous carpet or the like.

Although these known temporary floor mats protect the underlying permanent covering against wear, numerous problems continue to exist with their use. For example, it is common during use of motor vehicles for passengers to track mud, snow, and other debris onto the floor upon entering the vehicle, and conventional temporary mats must be frequently cleaned in order to maintain the appearance of the vehicle interior. Further, over time, conventional temporary mats lose their original shape and become unattractive so as to present as much of an eyesore as the debris itself.

OBJECTS AND SUMMARY OF THE INVENTION

Among other objects, it is an object of the present invention to provide a temporary floor mat which may be used in addition to or as an alternative of conventional temporary mats and which is disposable so as to permit replacement of the temporary mat once it becomes soiled. By providing such a temporary mat, it is possible to permit passengers to track any desired amount of debris onto the floor of the vehicle while enabling quick and efficient removal of the debris and cleanup of the vehicle simply by providing for the disposal of the temporary mat.

Another object of the invention is to provide a temporary floor mat that is separable into a pair of mat portions each adapted to underlie a different passenger area within the vehicle. Thus, it is possible to install the floor mat in a single step and to split the mat portions after they have served their purpose so that each of the mat portions may be separately rolled up and removed from the vehicle along with the debris collected on the mat portions.

In accordance with these and other objects, one aspect of the invention includes a floor mat for use in covering the floor of a motor vehicle, wherein the floor mat includes a corrugated layer having first and second opposing surfaces and a single face layer affixed to one of the surfaces of the corrugated layer so that the corrugated layer may be rolled up in a direction enclosing the face layer within the corrugated layer. Separation means are provided for permitting the floor mat to be split into first and second mat portions which may be separately rolled up and removed from the vehicle after use. The separation means includes at least one tear line which defines the first and second mat portions, each of which is adapted to underlie a separate passenger area of the motor vehicle.

According to another aspect of the invention, the mat includes a pair of closely spaced, parallel tear lines which together define a tear-strip adapted to be pulled from the floor mat in order to separate the first and second mat portions from one another.

Additionally, it is an object of the invention to provide a temporary floor mat of universal construction adapted for use in virtually all present-day vehicles. Such a universal floor mat is sized to fit on either the front driver's or passenger side floor of the vehicle, and is in the form of a generally trapezoidally-shaped body formed of a lowermost corrugated layer and a single face layer affixed to the corrugated layer.

BRIEF DESCRIPTION OF THE DRAWINGS FIGURES

A preferred embodiment of the invention is described in detail below with reference to the attached drawing figures, wherein:

FIG. 2 is a top plan view of the temporary floor mat of the first embodiment;

FIG. 3 is a front elevation view of the floor mat of FIG. 2;

FIG. 4 is a sectional view of an intermediate portion of the floor mat of FIG. 2 with the floor mat in position on the floor of the vehicle; FIG. 5 is a side elevation view of a temporary floor mat constructed in accordance with a second embodiment of the present invention;

FIG. 6 is a top plan view of the floor mat shown in FIG. 5;

FIG. 7 is a front elevation view of the floor mat shown in FIG. 5;

FIG. 8 is front elevation view of the floor mat of FIG. 5 with forward and lateral sections of the mat illustrated in a folded position;

FIG. 9 is a side elevation view of the floor mat of FIG. 5 with forward and lateral sections of the mat illustrated in a folded position;

DETAILED DESCRIPTION OF A PREFERRED EMBODIMENT

Figure 1:
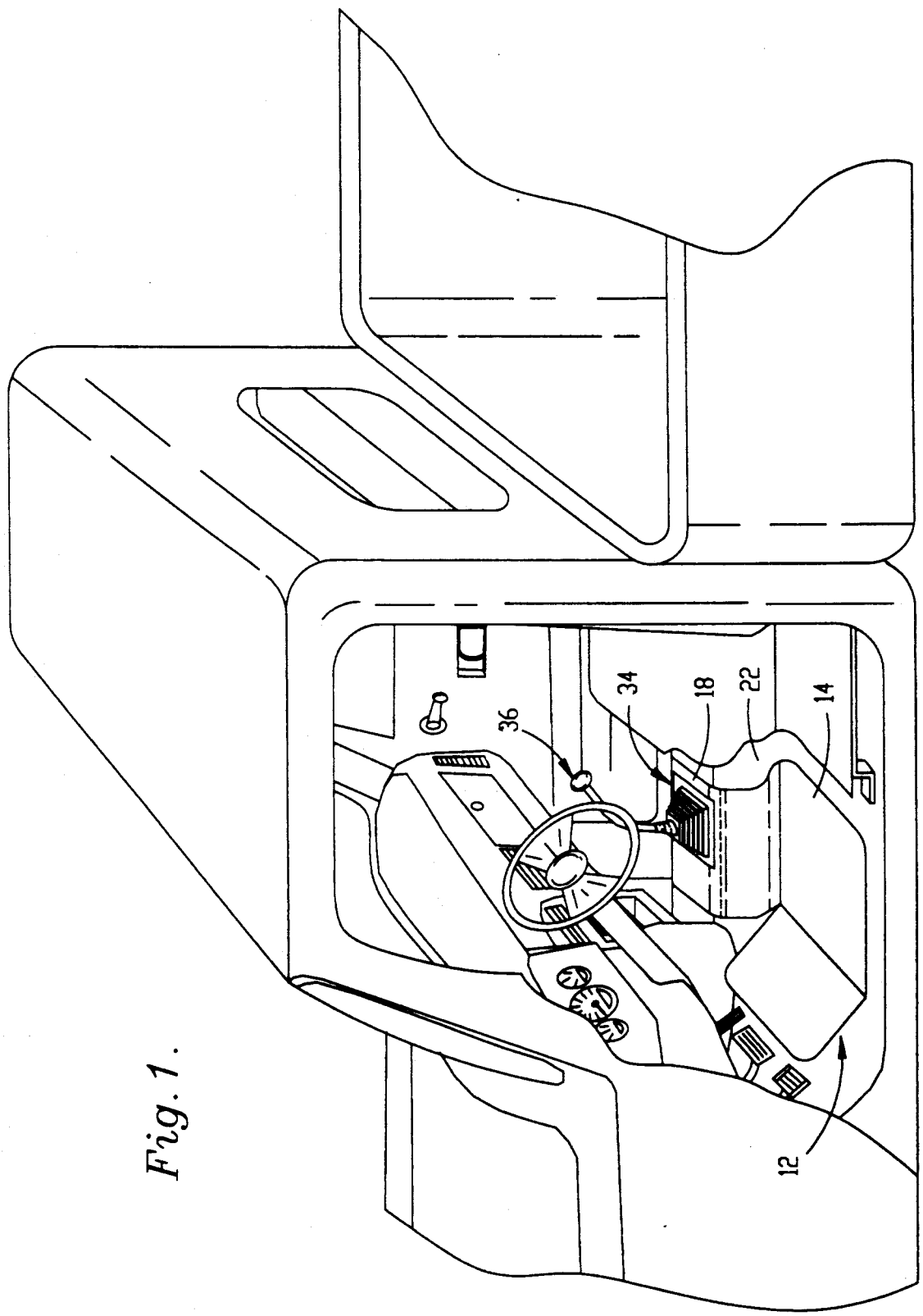
FIG. 1 is a perspective view of a motor vehicle having a temporary floor mat constructed in accordance with a first embodiment of the present invention.

A disposable rollup temporary floor mat constructed in accordance with a first preferred embodiment of the present invention is illustrated in FIG. 1, in position on the floor of a pickup truck.

As shown in FIG. 2, the floor mat 12 is initially formed of a single piece of material and includes first and second mat portions 14, 16, an intermediate section 18, and a pair of forward sections 20. The first mat portion 14 is adapted to cover the floor beneath the driver's feet while the second mat portion 16 is adapted to underlie the feet of a passenger. The intermediate section 18 extends between the two mat portions and is adapted to extend over and rest upon a console 22 provided in the vehicle as shown in FIG. 4.

Turning to FIG. 3, the floor mat 12 is shown as being formed of a layer 24 of corrugated fibrous material, preferably paper, having upper and lower surfaces, and a single face layer 26 affixed to one of the surfaces of the corrugated layer. By providing this single faced construction, it is possible to roll up the mat 12 or the portions 14, 16 in a direction enclosing the face layer 26 within the corrugated layer 24 such that any debris resting on the face layer is collected within the rolled mat so that the mat or mat portions may be removed from the vehicle without any of the debris falling inadvertently therefrom.

The floor mat 12 is provided with separation means, indicated broadly by numeral 28, as shown in FIG. 3, for permitting the first and second mat portions 14, 16 to be separated from one another so that each may be separately rolled up and removed from the vehicle after use. The separation means 28 includes at least one tear line 30 along which the mat may be split. Preferably, rather than providing a single tear line 30, a pair of closely spaced, parallel tear lines are provided which together define a first tear-strip 32 that is adapted to be pulled from the floor mat in order to separate the first and second mat portions 14, 16 from one another.

The intermediate section 18 of the floor mat may be provided with means 34 for permitting an opening to be made in the floor mat within a predetermined area. Such an opening is provided to permit the floor mat to rest on the floor of the vehicle while accommodating any upstanding component of the vehicle, such as a control stick 36 or the like, which is aligned with the opening.

Preferably, the opening means includes a scored line circumscribing the predetermined area so as to permit the material of the mat to be removed within the area where the control stick 36 is to be accommodated.

In order to simplify removal of the first and second mat portions 14, 16 and of the intermediate section 18, a second pair of closely spaced, parallel tear lines 30 are provided which together define a second tear-strip 32 spaced from the first tear-strip by a distance sufficient to permit the first and second mat portions to be individually removed from the vehicle independent of the intermediate section.

The forward section 20 associated with each of the first and second mat portions 14, 16 is separated therefrom by a fold line 38 formed by crushing the material of the corrugated layer along the line. The forward sections 20 are adapted to extend upward at an angle to the first and second mat portions 14, 16 so as to conform to the contour of the floor of the vehicle.

Prior to use, a floor mat 12 constructed in accordance with the first embodiment of the invention may be stored in a rolled-up condition with the corrugated layer 24 facing outward of the roll. In order to install the floor mat, the exposed lateral edge of the mat is positioned on the floor of the vehicle with the corrugated layer facing downward and the mat is unrolled across the floor in a transverse direction relative to the vehicle.

If a control stick 36 is present on the console 22 of the vehicle, the material within the predetermined area of the intermediate section 18 may be torn from the mat so that an opening is formed which will accommodate the control stick and which will permit the mat to rest directly on the floor as shown in FIG. 5. Thereafter, the floor mat provides temporary protection to the floor against contact with any mud, snow or other debris tracked into the vehicle by passengers.

Once an amount of debris has been collected on the temporary floor mat, the floor mat 12 may be removed by separating each of the mat portions 14, 16 from the intermediate section 18, rolling up the portions so that the face layer 26 and debris thereon is collected within the rolled up mat portions, and pulling the mat portions from the vehicle. Thereafter, the intermediate section 18 may be lifted over the control stick 36 and disposed of separately.

A second embodiment of the floor mat is illustrated in FIGS. 6–9. As shown in FIG. 6, this embodiment includes a mat 40 for use in covering a portion of the floor of a motor vehicle underlying a single passenger. The floor mat 40 includes a central portion 42 and forward and lateral sections 44, 46 each separated from the central portion by a fold line 48, 50 respectively, which permits the forward and lateral sections to be folded relative to the central portion to permit the mat to be shaped to conform to the contour of the floor of the vehicle.

The lateral section 46 of the mat 40 includes a forward tab 52 located adjacent the forward section 44, the forward tab being separated from the lateral section by a fold line 54 which is substantially collinear with the fold line 48 of the forward section.

As shown in FIG. 7, the mat 40 is formed of a corrugated layer 56 having first and second opposing surfaces, and a single face layer 58 affixed to the upper surface of the corrugated layer. By providing this single faced construction, it is possible to roll up the mat in a direction enclosing the face layer 58 within the corrugated layer 56 so that the mat and any dirt collected thereon during use may be neatly removed from the vehicle without spillage of the dirt.

At least one, and preferably several, strips 60 of adhesive material are provided on the second surface of the corrugated layer 56 along an edge 62 of the central portion 42 of the mat remote from the lateral section 46. These strips 60 of adhesive material serve the purpose of temporarily securing the mat to the floor of the vehicle during use. Preferably, a removable protective film layer 64 is provided on the adhesive material to protect the adhesive material prior to use of the mat.

In use, when it is desired to position the mat 40 on the floor of a vehicle, the protective film layer 64 is removed from each of the strips 60 of adhesive material and the mat is positioned in a desired location in the vehicle. Once properly oriented, the strips of adhesive material retain the mat and the forward and lateral sections 44, 46 are folded relative to the central portion 42 as shown in FIG. 8, to conform to the shape of the floor. As shown in FIG. 9, by folding the forward section 44 prior to the lateral section 46, it is possible to position the forward tab 52 behind the forward section in order to form a corner on the mat which prevents debris from reaching the underlying floor between the lateral and forward sections.

Figure 10:
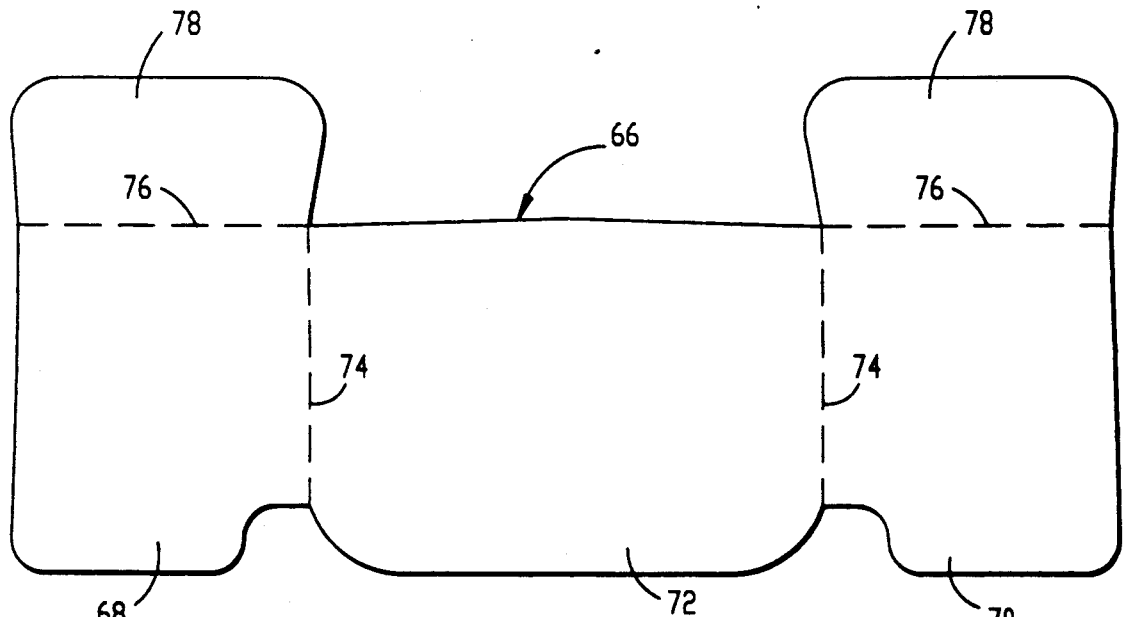
FIG. 10 is a top plan view of a temporary floor mat constructed in accordance with a third embodiment of the invention.

A mat 66 constructed in accordance with a third preferred embodiment of the present invention is shown in FIG. 10, and is similar to the embodiment discussed above with reference to FIGS. 1-5, by being formed of a single-faced, corrugated fibrous material. However, in the embodiment of FIG. 10, no tear-strips are provided between first and second mat portions 68, 70 and there is no means provided for forming an opening within an intermediate section 72 of the mat between the first and second mat portions.

However, the intermediate section 72 of the mat is defined by a pair of fold lines 74 which separate the first and second mat portions 68, 70 from one another. These fold lines 74, along with fold lines 76 separating each of the mat portions 68, 70 from a forward section 78 attached thereto, permit the mat to be shaped to conform with the floor of the vehicle.

Figure 11:
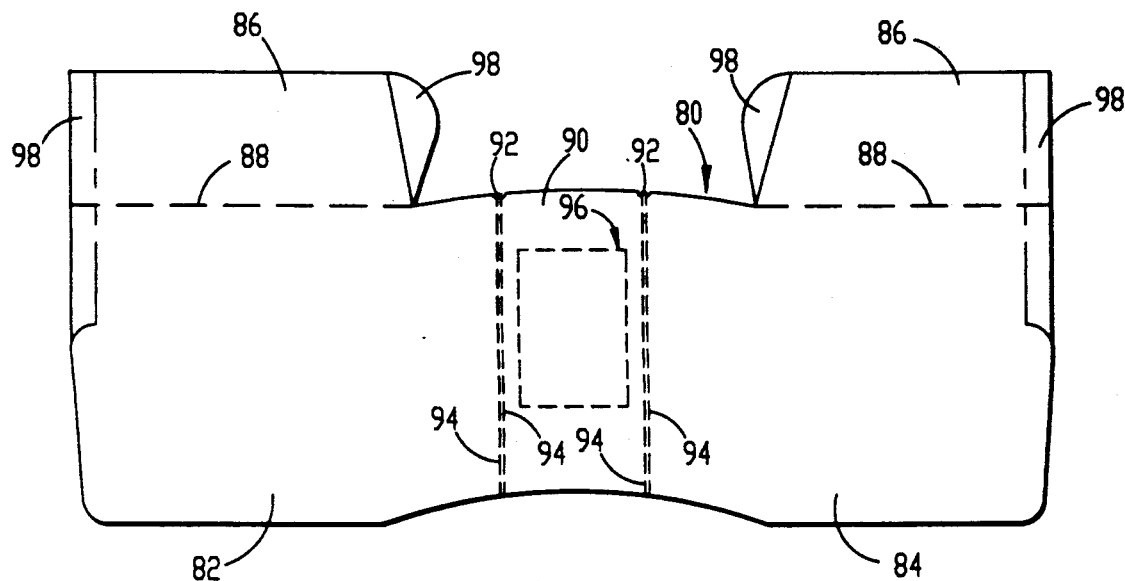
FIG. 11 is a top plan view of a temporary floor mat constructed in accordance with a fourth embodiment of the invention.

A fourth preferred construction of the present invention is illustrated in FIG. 11. According to this construction, a floor mat 80 is provided for use in covering the floor of a motor vehicle underlying two adjacent passenger areas in a manner similar to the construction discussed above with reference to FIGS. 1-5.

The floor mat 80 includes first and second mat portions 82, 84, each provided with a forward section 86 separated therefrom by a fold line 88, and an intermediate section 90 defined between a pair of tear-strips 92 separating the first and second mat portions. The fold lines 88 are formed by crushing or otherwise weakening the fibrous material of the floor mat along the fold line, and the tear-strips 92 each include a pair of closely spaced, parallel tear lines 94 which together define each strip.

The intermediate section 90 is provided with means 96 for permitting an opening to be made in the mat within a predetermined area in order to permit the mat to rest on the floor of the vehicle while accommodating any upstanding component such as a control stick or the like aligned with the opening.

A number of regions 98 on the mat may be mashed or crushed in order to increase the pliability of the material of the mat in order to further expedite shaping of the mat to conform with the contour of the floor. These crushed regions 98 may be located anywhere necessary on the mat in order to permit the mat to be fit within any of a number of different types of vehicles.

Figure 12:
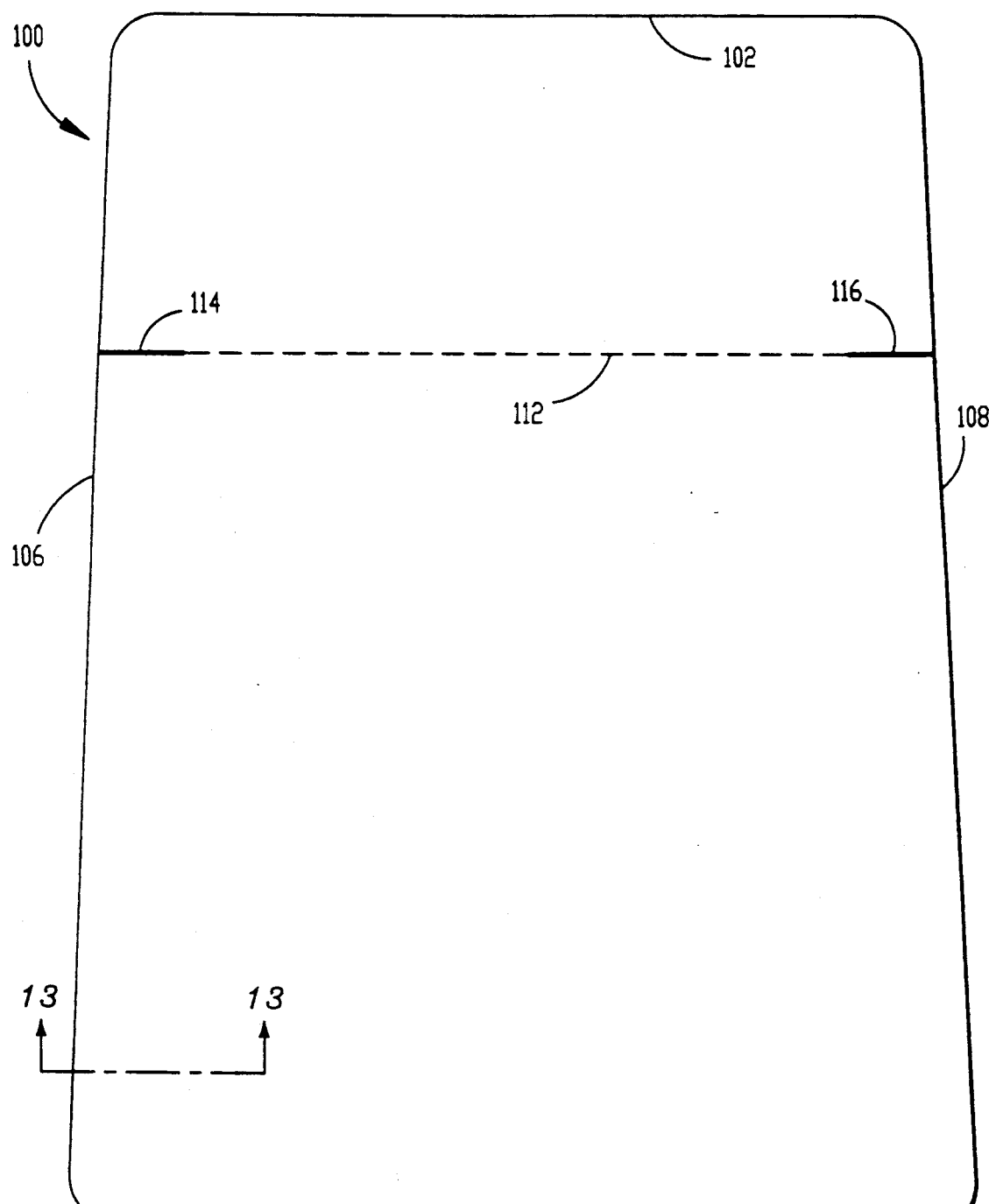
FIG. 12 is a plan view of a universal rollup floor mat in accordance with the invention which is adapted for placement on either the front driver or passenger side floor of a vehicle.
Figure 13:
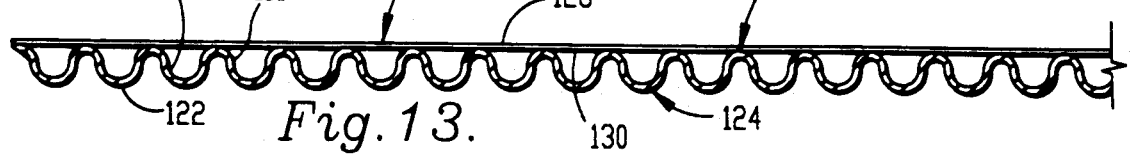
FIG. 13 is a sectional view taken along line 13—13 of FIG. 12.

FIGS. 12-13 depict a universal floor mat 100 in accordance with the invention. The mat 100 is designed to lie on the floor of a vehicle beneath either the driver or passenger's feet, and is configured to be adaptable for virtually any present-day vehicle. The mat 100 is generally trapezoidally shaped as best seen in FIG. 12 and presents an upper edge 102 and opposed lower edge 104, side edges 106, 108 and rounded corners, such as corner 110. Preferably, the mat 100 is sized such that the upper edge 102 has a length of from about 16-22 inches, and more preferably from about 17-20 inches; lower edge 104 has a length of from about 18-24 inches, and more preferably from about 20-22 inches; and the side edges 106, 108 have a length of from about 24-33 inches, more preferably from abut 26-30 inches.

The mat 100 further includes a line of weakness in the form of score line 112 extending thereacross in generally parallel relationship with the upper and lower edges 102, 104. The distance between score line 112 and top edge 102 is preferably from about 5-12 inches, and more preferably from about 6-10 inches. Additionally, a pair of opposed cuts 114, 116 are provided at the regions of the opposed ends of fold line 112. The respective cut preferably have a length of from about $\frac{1}{2}$-3 inches and extend inwardly from a corresponding side edge in alignment with the fold line 112.

The mat 100 includes a lowermost layer 118 formed of corrugated paper having upper and lower surfaces 120, 122 and presenting a plurality of elongated, juxtaposed, alternating, downwardly and upwardly peaked corrugations 124, 125. In addition, a second, uppermost panel 126 formed of paper and having opposed upper and lower surfaces 128, 130 forms a part of the mat 100, with the lower surface 130 being permanently adhered to the upwardly peaked corrugations 125. The upper surface 128 of the layer 126 presents a planar wear and dirt-collecting surface. Advantageously, the lowermost corrugated layer 118 is formed from 18-40 pound Kraft paper, whereas the upper layer 126 is formed from 18-62 pound Kraft paper. In preferred forms, the lower corrugated layer is formed using 30 pound Kraft paper whereas the upper panel is formed using 42 pound Kraft paper.

In the use of mat 100, the latter can be placed on the floor beneath the front driver or passenger side of a vehicle, with the corrugated layer 118 in direct contact with the vehicle carpeting so that the downwardly peaked corrugations 124 inhibit shifting of the mat. When sized as recited above, any excess width in the mat when used in a small vehicle is accommodated by virtue of the cut lines 114, 116, which allow the mat to deflect upwardly and inwardly. At the same time, use of the preferred paper grades insures that the mat gives adequate wear characteristics, while also allowing ready rollup of the mat as necessary for collection of dirt and debris.

Although the invention has been described with reference to a number of preferred illustrated constructions, it is noted that substitutions may be made and equivalents employed herein without departing from the scope of the invention as set forth in the accompanying claims. For example, although various features of the inventive floor mat are illustrated with reference to each of the illustrated embodiments, it is noted that these features may be employed as well in any desired combination to obtain a desired construction.

We claim:

1. A disposable, temporary automotive floor mat for collecting dirt and covering a portion of the floor of a motor vehicle, said floor mat consisting essentially of:
    a first, lowermost layer formed of from about 18-40 pound corrugated paper and having opposed upper and lower surfaces and presenting a plurality of elongated, juxtaposed, alternating, downwardly and upwardly peaked corrugations,
    the lower surface of said first layer being non-planar and presenting a plurality of spaced, elongated floor-engaging corrugation peaks for directly and conformably contacting said motor vehicle floor with said corrugations inhibiting shifting of the floor mat; and
    a second, uppermost panel layer formed of from about 18-62 pound paper having opposed upper and lower planar surfaces and with the lower surface thereof permanently adhered to the upwardly peaked corrugations of said first layer, the upper surface of said second layer presenting a planar wear and dirt-collecting surface for said floor mat, at least one of said first and second layer being essentially imperforate for preventing significant passage of dirt through the floor mat, said mat presenting opposed upper and lower edges and a pair of opposed side edges extending between and interconnecting said upper and lower edges, each of said corrugation peaks presenting a longitudinal axis oriented to lie in a direction that is generally parallel with a line extending from said upper edge to said lower edge, there being a line of weakness intermediate said upper and lower edges, generally parallel therewith, and oriented in transverse relationship with the longitudinal axes of said corrugation peaks, said line of weakness being closer to said upper edge than said lower edge, the length of said mat between said upper and lower edges being greater than the greatest width of the mat between said opposed side edges, said floor mat being operable for resting upon and conforming with either the front driver's side or front passenger's side floor section of said vehicle, and for rollup of the floor mat in a direction for enclosing said second panel layer within said first corrugated layer whereby dirt collected on said dirt-collecting surface remains within the rolled up floor mat for easy disposal.

2. The floor mat of claim 1, said mat being generally trapezoidal in plan configuration.

3. The floor mat of claim 2, said upper edge having a length of from about 16-22 inches, and said bottom edge having a length of from abut 18-24 inches.

4. The floor mat of claim 1, said line of weakness being spaced about 5-12 inches from said upper 5. The floor mat of claim 1, including a pair of relatively short cut lines respectively extending inwardly from a corresponding side edge and in alignment with said line of weakness, each of said cut lines having a length of from about ¾-3 inches.

* * * * *